A. CERRUTI.
APPARATUS FOR SORTING ARTICLES ACCORDING TO RELATIVE BUOYANCY.
APPLICATION FILED APR. 10, 1918.
1,312,098.
Patented Aug. 5, 1919.
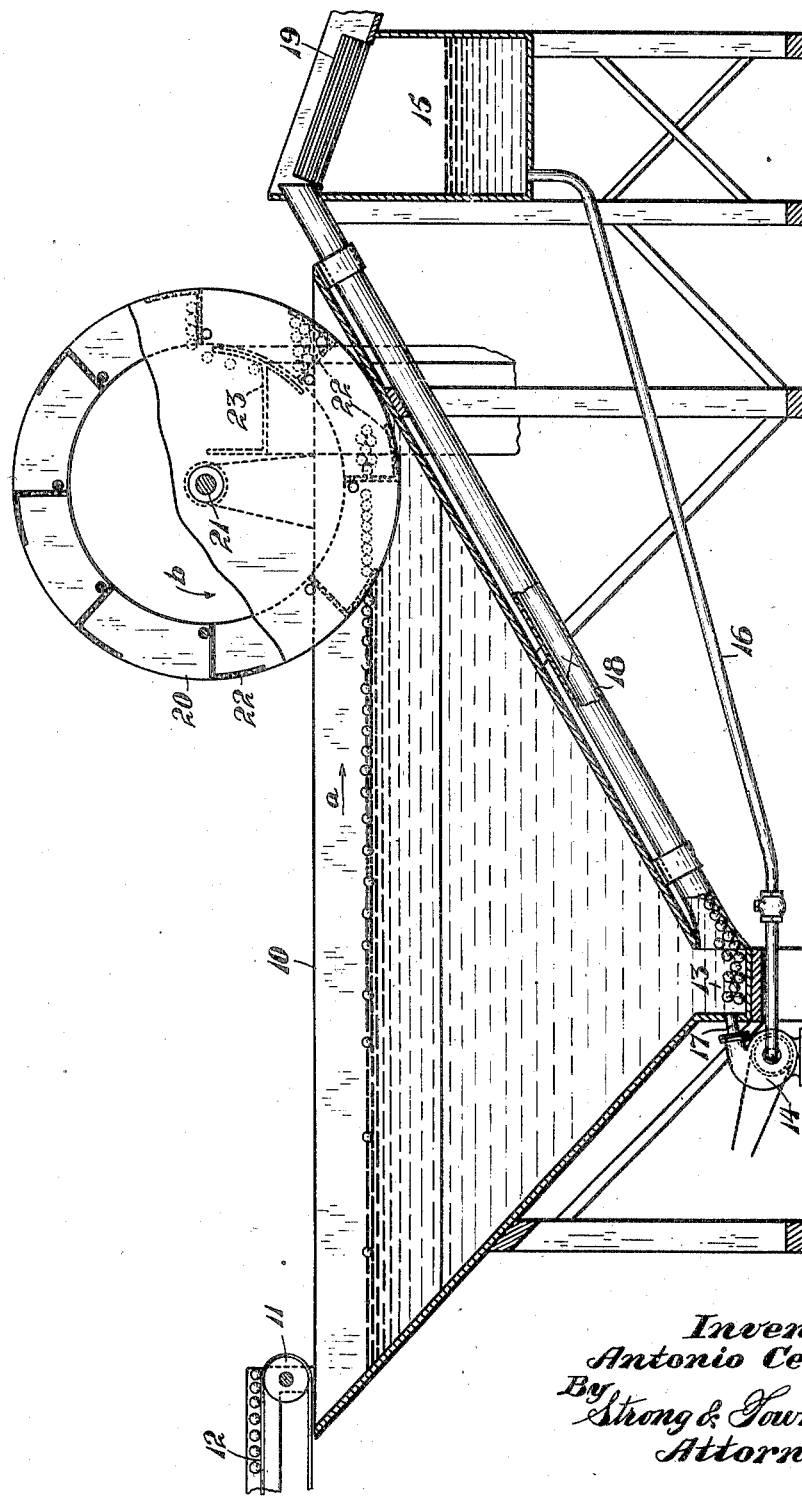
Inventor
Antonio Cerruti
By Strong & Townsend
Attorneys

UNITED STATES PATENT OFFICE.

ANTONIO CERRUTI, OF SAN FRANCISCO, CALIFORNIA.

APPARATUS FOR SORTING ARTICLES ACCORDING TO RELATIVE BUOYANCY.

1,312,098. Specification of Letters Patent. Patented Aug. 5, 1919.

Application filed April 10, 1918. Serial No. 227,791.

*To all whom it may concern:*

Be it known that I, ANTONIO CERRUTI, a citizen of the United States, residing at the city and county of San Francisco and State of California, have invented new and useful Improvements in Apparatus for Sorting Articles According to Relative Buoyancy, of which the following is a specification.

This invention relates to a sorting machine, and particularly pertains to a machine for sorting fruits and vegetables and their seeds.

One of the problems which has presented itself to the fruit and vegetable canning industry has been the sorting of the solid articles to be canned from those which are mushy and otherwise objectionable. Various devices have been provided for producing this result. However, many of them have been so designed as to further damage the rejected material after the desired material has been separated therefrom.

With this idea in view, the principal object of the present invention is to provide simple means for separating the desirable from the objectionable material and to thereafter draw the two classes of material away from the machine without damage thereto, thus insuring that both grades may be used for desired purposes without loss by handling in the sorting machine.

The present invention embodies the use of a brine tank to which the unsorted material is delivered and within which this material is divided, due to the variation in specific gravity or buoyancy of the desirable and objectionable grades of the material and the density of the brine, after which the desirable material is gathered and strained and the rejected material is carried from the bottom of the tank by fluid pressure means which prevents the mutilation of the fruit or vegetables.

The invention is illustrated by way of example in the accompanying drawing, in which—

The figure discloses one embodiment of the invention as seen in section and side elevation.

Referring more particularly to the drawings, 10 indicates a brine tank. This tank is formed with opposite vertical side walls and downwardly and inwardly converging end walls. Mounted above the tank and over one of the tapered end walls is a conveyer roller 11, over which a feed belt 12 passes. This belt carries unsorted fruit, vegetables or seeds to the tank and dumps them into the brine. This brine has been mixed to a certain density, which density bears a direct relation to the specific gravity or buoyancy of the substance to be sorted and will insure that the solid articles will be suspended at or near the surface of the brine while the objectionable articles will gravitate to the bottom of the tank, and, due to the convergent side wall construction thereof, will pass into a drain opening 13.

Mounted in communication with the drain opening 13 is a pump 14 through which brine is delivered from a drain tank 15 by means of a pipe 16. This pump is fitted with an inlet nozzle 17 which extends horizontally and will cause the incoming liquid to be forced transversely of the opening 13. Upon the opposite side of the opening 13 and in direct horizontal alinement with the mouth of the nozzle is an outlet pipe 18. This pipe extends obliquely upwardly to the top of the drain tank 15 and communicates with a suitably grated drain board 19 disposed thereover. The tube 18 is of sufficient diameter to permit the rejected fruit or vegetables to be forced upwardly therealong without clogging and thus insures that the force of the incoming liquid will carry the material up along the tube and deposit it upon the drain board 19. Here the brine will be drained off and allowed to return to the pump while the material may be carried off for suitable use.

It will be understood in the present specification that while fruit and vegetables are mentioned, the use of these words may be interchanged and that they also are meant to imply peas, beans and the seeds of vegetables.

As the material to be sorted is delivered by the conveyer 12 the desirable material will accumulate upon the surface of the brine and will be caused to float in the direction indicated by the arrow *a* due to the rotary action of a strainer 20. This strainer is mounted at the opposite end of the tank from the conveyer and is carried upon a horizontally disposed axle 21 by which it is rotated. Rotation is in the direction of arrow *b* and thus insures that its angle-shaped strainer blades 22 will pass through the water and draw the material toward the end of the tank. As these blades pass through the brine they will gather the sorted material accumulated and carry it upwardly until the radial portion of each blade has passed the horizontal, at which time the material will be poured into a chute 23. This chute extends into the center of the strainer drum and is in communication with each of the strainer blades as it passes upwardly from its vertical to the horizontal position and thus receives all of the material gathered by the blades.

It will thus be seen that the machine here disclosed is continuous in its operation, that it handles the material to be sorted without violence and thus insures that all of the material which passes through the machine will be in the same physical condition it was prior to the sorting operation, with the exception that it will be graded according to its condition. It will be further understood that when a collection of articles to be sorted of different specific gravities are passed through the machine it may be necessary to resort the material successively to obtain different grades or to segregate a certain class of articles. This will be the case when choke cherries are mixed with peas, at which time it will be necessary to first sort the entire quantity to eliminate the light choke cherries and thereafter to sort the peas to obtain the various grades desired.

While I have shown the preferred form of my invention as now known to me, it will be understood that various changes in the construction, combination and arrangement of parts may be made by those skilled in the art without departing from the spirit of the present invention as disclosed in the appended claim.

Having thus described my invention, what I claim and desire to secure by Letters Patent is—

In a machine for sorting fruits or vegetables, a brine tank having a chamber below its bottom and in communication with the tank interior, said tank and chamber each having a completely unobstructed interior, means to receive the uncontaminated fruits or vegetables, a conduit having a completely unobstructed inlet and leading from said chamber to said receiving means, means to force brine through said chamber so as to convey the fruits and vegetables through said conduit, means to remove the fruits and vegetables floating on the surface of the brine, and means to reconvey the brine from said receiving means back to said forcing means so as to reutilize said brine to force further fruits and vegetables through the conduit.

In testimony whereof I have hereunto set my hand in the presence of two subscribing witnesses.

ANTONIO CERRUTI.

Witnesses:
 W. W. HEALEY,
 M. E. EWING.